Aug. 2, 1949.  E. H. SCOVELL  2,477,834
CONNECTOR FOR PRESSURE LINES
Filed Aug. 14, 1946

Inventor
ERIC HERBERT SCOVELL
By
Haseltine, Lake & Co.
Attorneys

Patented Aug. 2, 1949

2,477,834

UNITED STATES PATENT OFFICE 2,477,834

CONNECTOR FOR PRESSURE LINES

Eric Herbert Scovell, Glandore, South Australia, Australia

Application August 14, 1946, Serial No. 690,478
In Australia September 8, 1945

3 Claims. (Cl. 285—168)

This invention relates to an improved connector for pressure lines and in particular it relates to a connector for lubricating apparatus coupling a grease gun to a nipple having a bulbous end such as that commonly used on automobiles.

In connecting a grease gun it is customary to use a socket which is adapted to engage and lock to a nipple in such a manner that when the pressure is being applied the joint will be firmly held together but when it is desired to remove the connector from the nipple it should only be necessary to displace the connector from substantial axial alignment with the nipple whereupon release would automatically be effected.

With apparatus of the type constructed heretofore certain difficulties have been experienced which it is the object of this invention to overcome, one of such difficulties being the arrangement of gripping members which, while effecting a rigid hold, may not allow the socket to be readily withdrawn from the associated nipple when this is required.

According to this invention the gripping members are in the form of balls or similar members which can be rolled which are projected forwardly by suitable means to effect a lock on a nipple, the gripping members being however disengageable from the nipple by moving the gripping members rearwardly, the use of balls or rollable members preventing sticking after the pressure is removed as they can be rolled out of the locking position.

In order however that the invention may be more clearly understood it will now be described with reference to the accompanying drawings in which—

Figure 1:
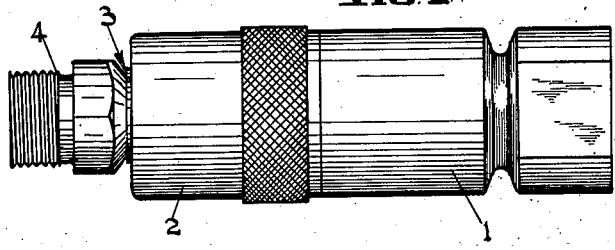
Fig. 1 is an elevation of the connector showing the nipple positioned therein.
Figure 2:
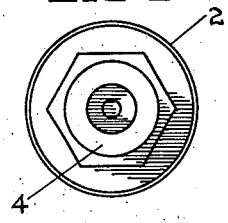
Fig. 2 is an end view of Fig. 1.
Figure 3:
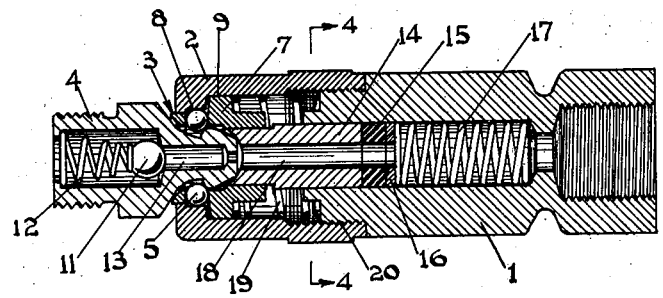
Fig. 3 is a central sectional elevation of the connector showing the nipple sectioned and in position.
Figure 4:
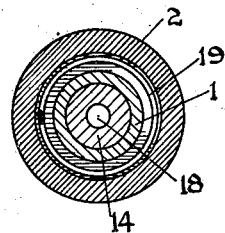
Fig. 4 is a section on line 4—4 of Fig. 3.

Referring to Figs. 1, 2, 3 and 4, a body member 1 is adapted to have its one end secured to a grease gun or connection whereby the pressure grease is being supplied thereto, the other end of this body member 1 being in the form of a hollow socket member 2 having within it a cage 7 the front part of which forms a socket 3 adapted to slip over the bulbous end of the nipple 4 in a withdrawable manner, the nipple 4 engaging members consisting of a series of balls 5 which are so positioned that when the balls 5 have been engaged behind the line of maximum diameter of the bulbous end of the nipple 4, they will co-operate with a reduced portion 8 within the hollow socket member 2 in such a manner that the socket 3 cannot be withdrawn from the nipple 4 while the socket 3 and the nipple 4 are in axial alignment or approximately axial alignment.

The nipple 4 has a ball 11 spring loaded by a spring 12 so that the pressure of the lubricant in the nipple will close a channel 13 in the nipple 4 when no pressure is being applied from the lubricant supplied. When the nipple 4 is held in position in the socket 3 the channel 13 in the said nipple communicates with a further channel 18 in a sealing piston 14 which has a concave end to engage the bulbous end of the socket to allow angular movement of the connector on the nipple, the said channel 18 having access to the lubricant supplied through the end of the body member 1.

The cage 7 which carries the balls 8 is freely slidable in the hollow 9 in the socket member 2 and fits around the front part of a sealing piston 14, the cage being normally projected forwardly by a spring 19 which is confined between the cage 7 and the body member 1.

The sealing piston 14 has at its rear an annular resilient washer 15 which is in turn backed by a washer 16 and a spring 17, the spring 17 normally projecting the sealing piston 14 but allowing same to be pushed back when the device is engaged on a nipple 4. The purpose of the resilient washer 15 is to form a seal to prevent leakage of lubricant past the piston 14. The socket member 2 is joined to the body member 1 by a screw thread 20 to allow assembly of the unit.

The operation of the device is as follows:

When the socket portion 3 of the cage 7 is engaged over a nipple 4, the balls 5 are pushed rearwardly out of the reduced portion 8 of the hollow a sufficient distance to allow them to move outwardly to pass over the highest point of the nipple. During the rearward deflection of the balls 5 the cage 7 is of course moved rearwardly against the pressure of the spring 19 and also the spring 17 as the piston 14 is normally urged forwardly by the springs 17 and a shoulder on this piston then bears against the rear of the cage 7.

As soon as the balls drop into the reduced portion behind the bulbous end of the nipple 4 the socket member 2 and body member 1 move back to securely engage the balls in the reduced portion 8 of the hollow and therefore preventing the device from being pulled off the nipple while the balls are in this locked position.

Holding of the balls in the locked position is in this case independent of pressure applied by the sealing piston 14.

To disconnect the device from the socket 4 the body member 1 is displaced from axial alignment with the nipple that is the connector is twisted sideways, this action causing the cage to be moved rearwardly against the action of the springs 19 until the balls move out of the reduced portion 8 of the hollow a sufficient distance to allow same to pass over the highest point on the bulbous end of the nipple 4.

Figure 5:
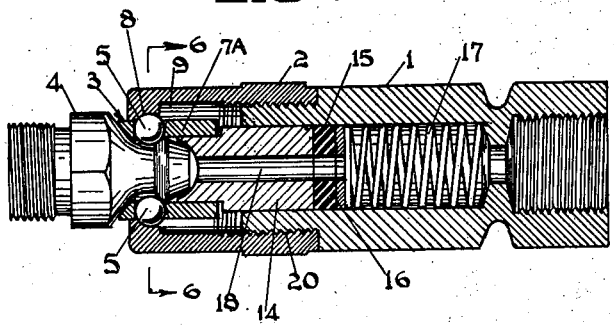
Fig. 5 is a central sectional view of a modification of the connector showinng the nipple positioned therein, the outer elevation of said view corresponding with the elevation shown in Fig. 1.
Figure 6:
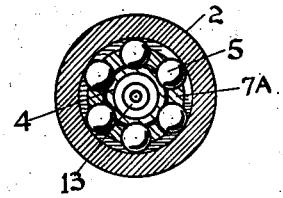
Fig. 6 is a section on line 6—6 of Fig. 5.

In the embodiment shown in Figs. 5 and 6 a similar arrangement exists as that just described but in this case the cage 7A is not held by a spring corresponding to the spring 19 but is pushed forwardly by the spring 17, the shoulder on the piston 14 being so positioned that it normally engages the back of the cage 7A to hold the cage forwardly.

In this embodiment the balls are directly held in their locked position during lubrication by pressure applied to the piston 14 by the lubricant. Twisting of the body member 1 out of alignment with the nipple will again move the balls out of the reduced portion 8 of the hollow socket member 2 to allow the balls to move over the highest point of the bulbous end of the nipple.

In both of the embodiments shown the locking members are capable of being rolled, this rolling action being of particular importance in preventing locking of the connector to the nipple, previous embodiments utilising jaws being not so readily releasable as the friction of jaws is considerably higher than the rollable members of this invention, these members allowing ready twisting of the connector on the nipple and thus allowing the connector to be rolled off the nipple.

What I claim is:

1. For connecting a grease gun to nipples having a bulbous end, an improved connector comprising; a body, a hollow socket member engaged thereon, a cage axially movable in said socket member, rollable locking members in said cage, a reduced portion in said hollow socket member to force said rollable locking members inwards when the cage is moved forward, means engaging said cage to urge said cage forward to position said rollable locking members in the reduced portion of said hollow, a sealing piston movable axially within the said body and cage, a concave end on said sealing piston to engage the bulbous end of the nipple, and spring means to urge said piston forward, said cage projecting from the end of the socket member to be engaged on a nipple to move the socket member forward over the cage to position the rollable members in the larger portion of the hollow and roll the rollable members off the nipple over the larger diameter of the bulbous end of same when the said socket member is forced out of axial alignment with the said nipple.

2. For connecting a grease gun to nipples having a bulbous end, an improved connector according to claim 1 characterised by spring means engaging said cage to urge said cage forwardly.

3. For connecting a grease gun to nipples having a bulbous end, an improved connector according to claim 1 characterised by a shoulder on the said sealing piston to urge said cage forwardly.

ERIC HERBERT SCOVELL.

REFERENCES CITED

The following references are of record in the file of this patent:

UNITED STATES PATENTS

| Number | Name | Date |
|---|---|---|
| 2,394,236 | Eastman | Nov. 15, 1943 |
| 2,397,342 | Farrell | Mar. 26, 1946 |